(12) United States Patent
Wakabayashi et al.

(10) Patent No.: US 12,517,226 B2
(45) Date of Patent: Jan. 6, 2026

(54) PROTECTION COVER AND LIGHT EMITTING DEVICE

(71) Applicant: SONY SEMICONDUCTOR SOLUTIONS CORPORATION, Kanagawa (JP)

(72) Inventors: Takahiro Wakabayashi, Kumamoto (JP); Shoji Seta, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 997 days.

(21) Appl. No.: 17/633,786

(22) PCT Filed: Jun. 4, 2020

(86) PCT No.: PCT/JP2020/022127
§ 371 (c)(1),
(2) Date: Feb. 8, 2022

(87) PCT Pub. No.: WO2021/033391
PCT Pub. Date: Feb. 25, 2021

(65) Prior Publication Data
US 2022/0291344 A1 Sep. 15, 2022

(30) Foreign Application Priority Data
Aug. 16, 2019 (JP) ................. 2019-149359

(51) Int. Cl.
*G01S 7/481* (2006.01)
(52) U.S. Cl.
CPC ................. *G01S 7/4813* (2013.01)

(58) Field of Classification Search
CPC ............... F21V 19/003; F21V 19/0035; F21Y 2115/10; G06F 3/042; G06S 7/481
See application file for complete search history.

(56) References Cited

U.S. PATENT DOCUMENTS 5,438,586 A * 8/1995 Ishii .................... H01S 5/02257
6,100,983 A * 8/2000 Oda ........................ G01S 17/48
356/615

(Continued)

FOREIGN PATENT DOCUMENTS

| CN | 106873063 A | 6/2017 |
| CN | 108983432 A | 12/2018 |

(Continued)

OTHER PUBLICATIONS

International Search Report and Written Opinion of PCT Application No. PCT/JP2020/022127, issued on Aug. 25, 2020, 08 pages of ISRWO.

*Primary Examiner* — William J Carter
(74) *Attorney, Agent, or Firm* — CHIP LAW GROUP

(57) ABSTRACT

Safety of a user or the like is secured even when such malfunctions as a case that an optical system member has gone out of place occur. Provided is a protection cover which covers a light source device including a light source, an emitting section which is an optical system member that converts light of the light source into diffused light to emit the light, and a light receiving section that senses the light of the light source reflected by the emitting section. The protection cover which covers the light source device includes an opening arranged adjacent to the emitting section and having a shape that allows transmission of the emitted light and also that prevents a finger of a person from contacting the emitting section.

10 Claims, 6 Drawing Sheets

(56) References Cited

U.S. PATENT DOCUMENTS

| | | |
|---|---|---|
| 2008/0218769 A1 | 9/2008 | Ahn et al. |
| 2016/0102840 A1* | 4/2016 | Feurle .................. F21V 17/164 362/341 |
| 2018/0239455 A1 | 8/2018 | Jia et al. |

FOREIGN PATENT DOCUMENTS

| | | |
|---|---|---|
| CN | 109756654 A | 5/2019 |
| JP | 06-169136 A | 6/1994 |
| JP | 07-273365 A | 10/1995 |
| JP | 2008-226224 A | 9/2008 |
| JP | 2011-096208 A | 5/2011 |
| JP | 2019041201 A | 3/2019 |
| WO | 2011/052789 A1 | 5/2011 |

\* cited by examiner

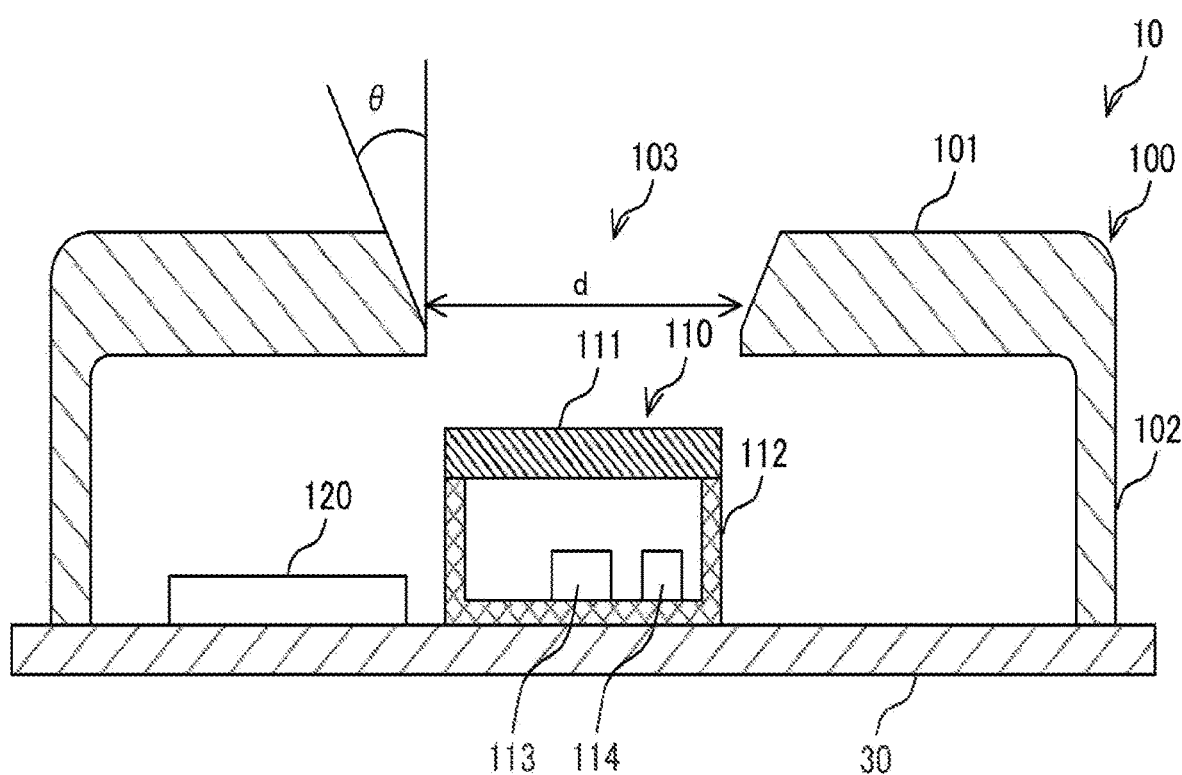
F I G . 2

PROTECTION COVER AND LIGHT EMITTING DEVICE

CROSS REFERENCE TO RELATED APPLICATIONS

This application is a U.S. National Phase of International Patent Application No. PCT/JP2020/022127 filed on Jun. 4, 2020, which claims priority benefit of Japanese Patent Application No. JP 2019-149359 filed in the Japan Patent Office on Aug. 16, 2019. Each of the above-referenced applications is hereby incorporated herein by reference in its entirety.

TECHNICAL FIELD

The present disclosure relates to a protection cover and a light emitting device. Specifically, the present disclosure relates to a protection cover that protects a light source such as a laser light source, and to a light emitting device that uses the protection cover.

BACKGROUND ART

Conventionally, distance measuring devices that measure a distance to a subject or an object have been used. For example, a light source device and an image-capturing element are included, a subject is irradiated with infrared light or the like from a light source, and the infrared light reflected from the subject is sensed. Next, a distance measuring device that measures time required for the infrared light to make a round trip to the subject, and calculates a distance to the subject is used. Such a distance measurement method is referred to as the ToF (Time of Flight) method. Distance measuring devices adopting the ToF method are arranged in a camera or the like, and are used for measurement of the distance to a subject that is arranged relatively far away. A high-output laser light source is used as a light source, and an optical system member that converts laser light from the laser light source into diffused light is arranged. A subject is irradiated with the laser light having been converted into the diffused light by the optical system member.

On the other hand, as distance measuring devices to measure relatively short distances, distance measuring devices adopting a triangular distance measurement method have been used. In the triangular distance measurement method, a subject is irradiated with laser light, and when reflection light from the subject is sensed, an angle of incidence of the reflection light, and a distance between a position of incidence of the reflection light and a light source are measured. By using the light source, the subject, and the position of incidence of the reflection light as vertices of a triangle, the distance to the subject can be measured. As such a distance measuring device, for example, an optical sensor that uses a light emitting diode (LED) as a floodlight element, and includes an optical cylinder and a floodlight lens as optical system members has been used (see PTL 1, for example). In the optical sensor, a position sensing element is used as a light receiving element, and the distance to an object is measured by the triangular distance measurement method.

CITATION LIST

Patent Literature

[PTL 1]
Japanese Patent Laid-open No. H07-273365

SUMMARY

Technical Problem

There is a problem regarding the conventional technologies mentioned above that, when an optical member has gone out of place, safety of a user or the like cannot be secured. Measurement of a distance to a relatively remote subject requires use of a high-output laser light source as a floodlight element. If an optical system member such as the optical cylinder mentioned above goes out of place, there is a possibility that laser light is radiated in an unexpected direction, and causes an injury to an eye or the like of a person when the eye or the like is irradiated with the laser light.

The present disclosure has been made in view of the problem mentioned above, and an object of the present disclosure is to secure safety of a user or the like even when such malfunctions as a case that an optical system member has gone out of place occur.

Solution to Problem

The present disclosure has been made to solve the problem mentioned above, and a first aspect thereof is a protection cover which covers a light source device including a light source, an emitting section that converts light of the light source into diffused light to emit the light, and a light receiving section that senses the light of the light source reflected by the emitting section, in which the protection cover includes an opening arranged adjacent to the emitting section and having a shape that allows transmission of the emitted light and also that prevents a finger of a person from contacting the emitting section.

In addition, in this first aspect, the opening may have a shape that prevents a probe made to imitate a finger of a person prescribed in IEC62368-1 from contacting the emitting section.

In addition, in this first aspect, the opening may have a rectangular shape.

In addition, in this first aspect, the opening may have a rectangular shape having lengths of sides which are equal to or shorter than 4.6 mm.

In addition, in this first aspect, the opening may have a circular shape.

In addition, in this first aspect, the opening may have a circular shape having a diameter which is equal to or shorter than 5.1 mm.

In addition, in this first aspect, a vertical distance between an end section of the opening and the emitting section may be longer than 1 mm.

In addition, in this first aspect, the opening may have a tapered shape.

In addition, in this first aspect, the protection cover may include a member that blocks the emitted light.

In addition, a second aspect of the present disclosure is a light emitting device including a light source device including a light source, an emitting section that converts light of the light source into diffused light to emit the light, and a light receiving section that senses the light of the light source reflected by the emitting section, and a protection cover which covers the light source device and includes an opening arranged adjacent to the emitting section and having a shape that allows transmission of the emitted light and also that prevents a finger of a person from contacting the emitting section.

In addition, in this second aspect, the light emitting device may further include a driving circuit that drives the light source device.

By adopting such aspects, it is possible to reduce reflection light from the protection cover in a case where the emitting section which is an optical system member has gone out of place. It is expected that the precision of sensing as to whether the emitting section has gone out of place based on changes of the reflection light entering the light receiving section is enhanced.

BRIEF DESCRIPTION OF DRAWINGS

FIG. 2 is a cross-sectional view depicting a configuration example of a light emitting device according to the embodiment of the present disclosure.

DESCRIPTION OF EMBODIMENTS

Next, a mode for carrying out the present disclosure (hereinafter, referred to as an embodiment) is explained with reference to the figures. In the following figures, identical or similar portions are given identical or similar reference signs. In addition, explanations of the embodiment are given in the following order.
1. Embodiment
2. Modification Example 1. Embodiment

[Distance Measuring Device]

Figure 1A:
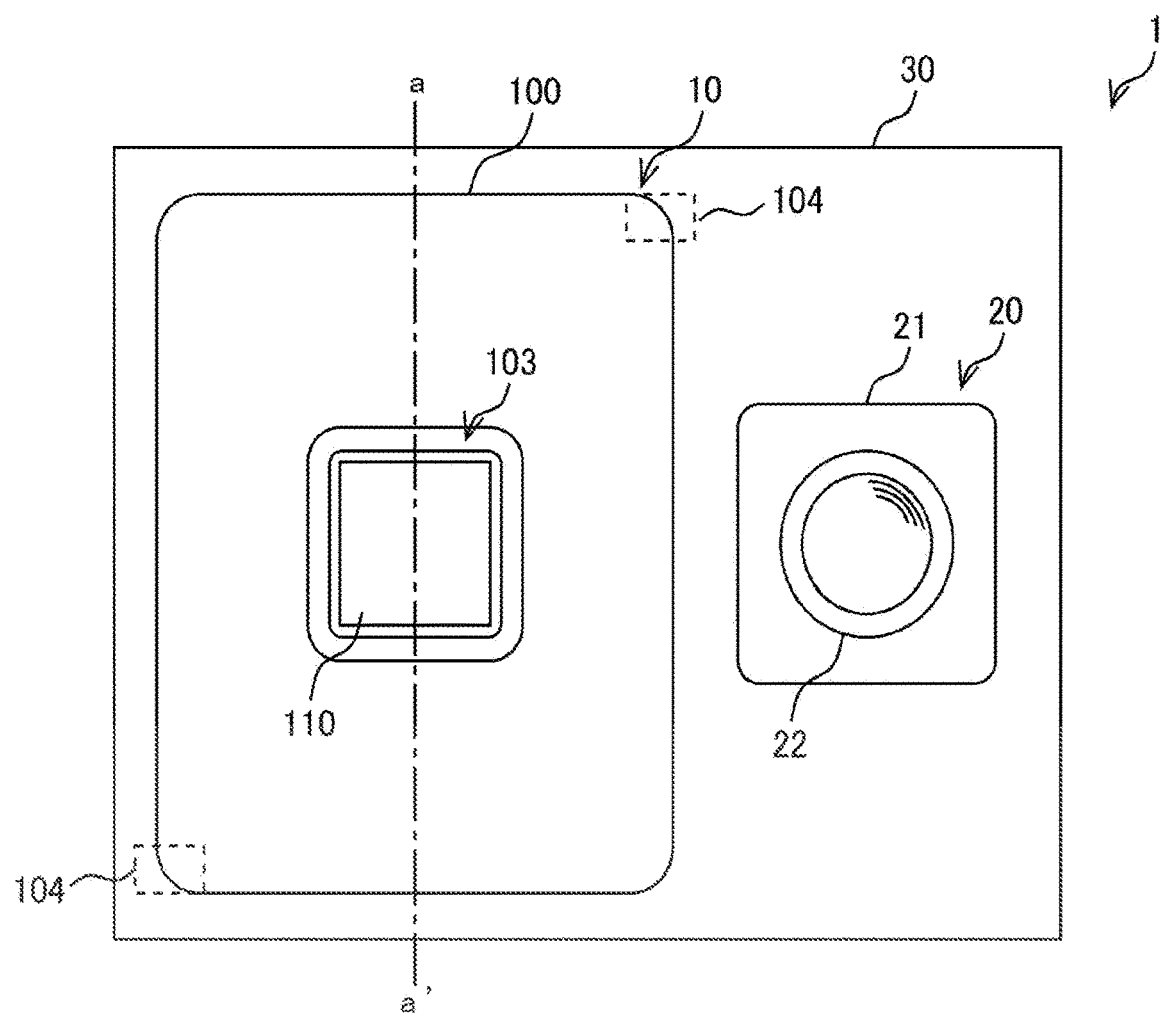
FIGS. 1A and 1B depict figures illustrating a configuration example of a distance measuring device according to an embodiment of the present disclosure.
Figure 1B:
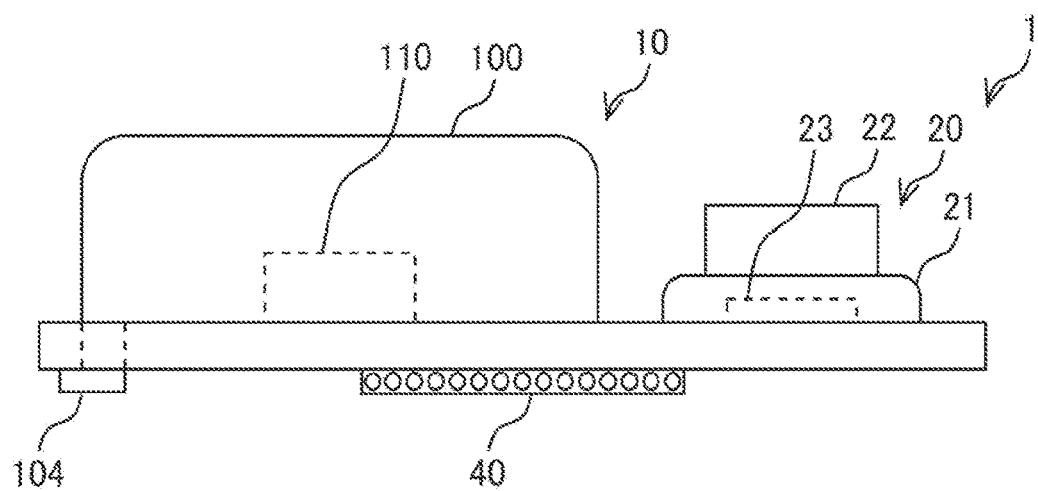

FIGS. 1A and 1B depicts figures illustrating a configuration example of a distance measuring device according to an embodiment of the present disclosure. The figure depicts a configuration example of a distance measuring device 1. FIGS. 1A and 1B correspond to a top view and a side view of the distance measuring device 1, respectively. The distance measuring device 1 is a device that measures a distance to a target object such as a subject. The distance measuring device 1 in the figure performs distance measurement by the ToF method mentioned above. The distance measuring device 1 includes a light emitting device 10 and a light receiving device 20. The light emitting device 10 and the light receiving device 20 are implemented on a substrate 30. In addition, the substrate 30 has a connector 40 arranged thereon. Signal communication with external equipment is performed via the connector 40.

The light emitting device 10 includes a light source device 110 and is configured to emit light such as infrared light to a target object. The light source device 110 is implemented on the substrate 30 and emits light from its top surface. In addition, the light emitting device 10 has a protection cover 100 that is arranged thereon and that protects the light source device 110. The protection cover 100 has an opening 103 arranged therethrough. The light source device 110 emits light through the opening 103. As mentioned below, the opening 103 in the figure can have a rectangular shape or can have a tapered shape. The protection cover 100 has two claw sections 104 arranged at its bottom section. The two claw sections 104 are arranged at diagonally opposite corners, are inserted through through-holes formed in the substrate 30 to be hooked with the rear surface side of the substrate 30 and fixes the protection cover 100 to the substrate 30. Note that one of the two claw sections 104 is depicted in B in the figure.

The light receiving device 20 is configured to sense light. The light receiving device 20 senses light that is emitted from the light emitting device 10 and reflected by a target object. The light receiving device 20 in the figure includes a housing 21, a lens barrel 22, and an image-capturing element 23. The image-capturing element 23 is a semiconductor element that converts incident light into image signals. The image-capturing element 23 includes a plurality of pixels that is arranged in a two-dimensional grid. A photoelectric converting section that converts incident light into an electric signal is arranged for each pixel, and image signals to form an image based on reflection light from a subject can be generated. The lens barrel 22 has a built-in lens and is configured to form an image of reflection light from a subject in the image-capturing element 23. The housing 21 is a housing which holds the lens barrel 22 and also covers the image-capturing element 23.

[Configuration of Light Emitting Device]

FIG. 2 is a cross-sectional view depicting a configuration example of the light emitting device according to the embodiment of the present disclosure. The figure is a cross-sectional view taken along line a-a' of the distance measuring device 1 in FIGS. 1A and 1B. As depicted in the figure, the light source device 110 and a driving circuit 120 are arranged inside the protection cover 100.

The light source device 110 includes an emitting section 111, a housing 112, a light source 113 and a light receiving section 114. The emitting section 111 and the housing 112 are included in a package incorporating the light source 113. The emitting section 111 corresponds to the top plate of the package.

The light source 113 is configured to generate light used for distance measurement. The light source 113 can include a laser light source that generates laser light, for example. Specifically, as the light source 113, a surface emission laser element that radiates laser light in the vertical direction can be used.

The light receiving section 114 is configured to receive light emitted from the light source 113. For example, the light receiving section 114 can include a photodiode, converts received light into an electric signal, and outputs the electric signal. The light receiving section 114 in the figure receives light that is generated by the light source 113, and reflected by the emitting section 111.

The emitting section 111 is configured to protect the light source 113 and also to transmit laser light generated by the light source 113. In addition, the emitting section 111 converts laser light into diffused light. Due to this conversion, laser light, which is point emission light, is converted into surface emission light. As the emitting section 111, for example, a diffuser can be used. The diffuser can include glass or the like having a front surface on which fine irregularities are formed.

The light source 113 and the light receiving section 114 are implemented on the bottom surface inside the housing 112. Specifically, semiconductor chips constituting the light source 113 and the light receiving section 114 are adhered onto the bottom surface inside the housing 112. Wires are formed on the bottom surface of the housing 112, and the light source 113 and the light receiving section 114 are electrically connected to the wires by wire bonding or the like. In addition, the wires are arranged penetrating the bottom surface of the housing 112 and are connected to terminals (not depicted) arranged on the rear surface side of the housing 112. The terminals correspond to input/output terminals of the light source device 110 and are connected to wires arranged on the front surface of the substrate 30 by soldering or the like.

The driving circuit 120 is a circuit that drives the light source device 110. For example, the driving circuit 120 includes a resin-sealed semiconductor chip, and performs driving of the light source 113 of the light source device 110. Specifically, the driving circuit 120 drives the light source 113 in such a manner to supply a drive signal serving as a power supply to the light source 113 and cause the light source 113 to emit light. In addition, the driving circuit 120 further performs processes on signals output from the light receiving section 114. Details of the processes of the driving circuit 120 are mentioned below. Similarly to the light source 113, the driving circuit 120 is implemented on the substrate 30 by soldering or the like.

The protection cover 100 includes a wall section 102 and a top plate 101 that surround the light source device 110 and the driving circuit 120. The top plate 101 has the opening 103 arranged therein. The opening 103 is arranged adjacent to the emitting section 111 of the light source device 110 and allows passage of light having been transmitted through the emitting section 111. The opening 103 in the figure represents an example in which the opening 103 is arranged directly above the emitting section 111. In addition, the opening 103 in the figure represents an example in which the opening 103 has a tapered shape. Specifically, the opening 103 in the figure has a tapered shape whose opening area of the top plate on the front surface side is larger than the opening area on the rear surface side of the top plate. An angle θ of this tapering can be set to an angle, for example 32°, which is approximately the same as an angle of emission of emitted light of the light source device 110. In addition, an opening width d of the opening 103 depicted in the figure can be set to a value which is equal to or shorter than 4.6 mm, for example. Details of the opening width of the opening 103 are mentioned below. The protection cover 100 can include a metal or resin, for example. In addition, the protection cover 100 suitably includes a member that blocks light generated by the light source device 110. This is because unnecessary radiation of laser light from the light source device 110 can be reduced.

[Configuration of Distance Measuring Device]

Figure 3:
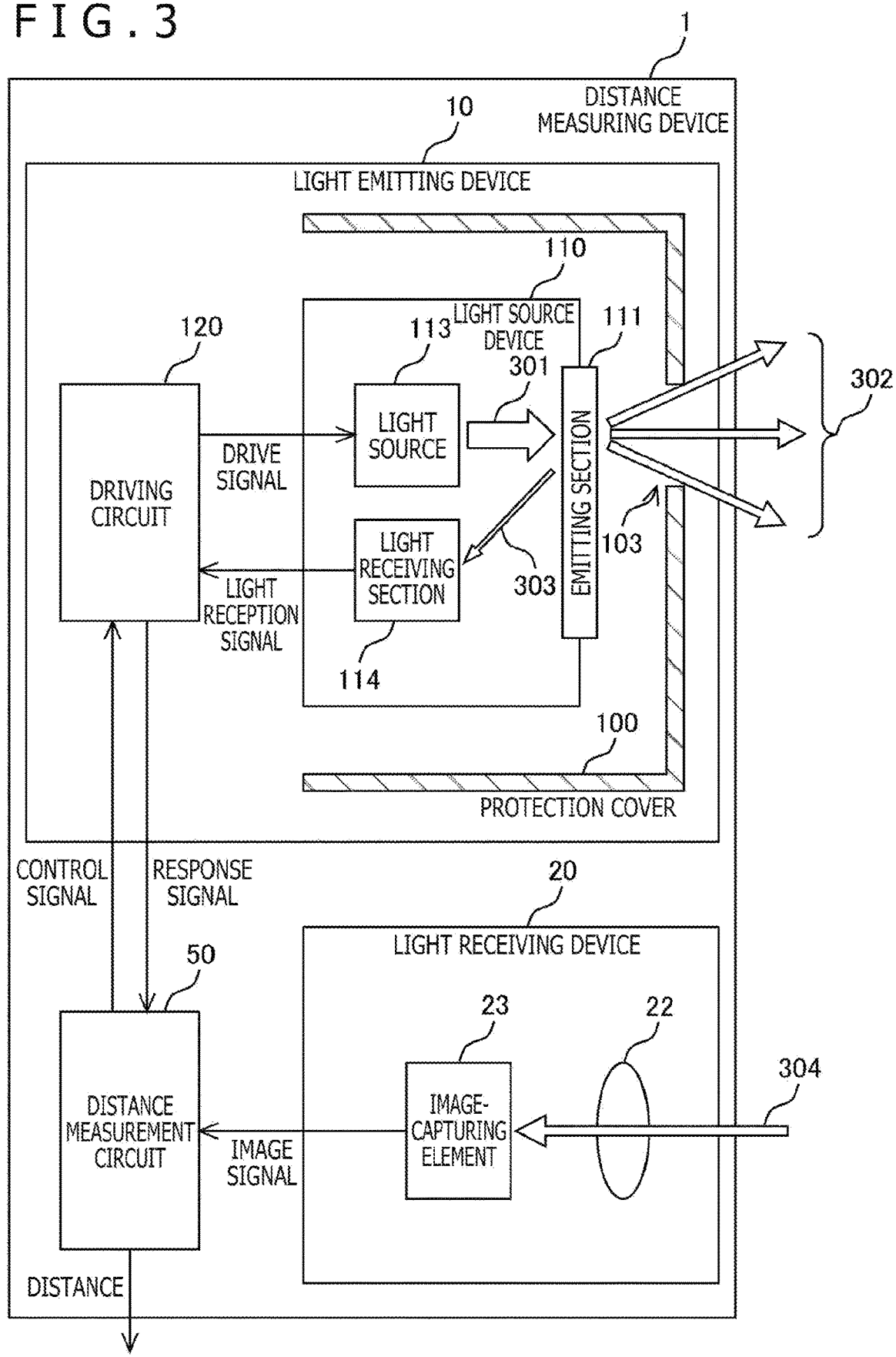
FIG. 3 is a block diagram depicting a configuration example of the distance measuring device according to the embodiment of the present disclosure.

FIG. 3 is a block diagram depicting a configuration example of the distance measuring device according to the embodiment of the present disclosure. The figure is a block diagram depicting a configuration example of the distance measuring device 1. The distance measuring device 1 in the figure further includes a distance measurement circuit 50 (not depicted in FIGS. 1A and 1B) in addition to the light emitting device 10 and the light receiving device 20. Note that in the figure, solid line arrows represent transmission of electric signals, and outlined arrows represent propagation of light.

The distance measurement circuit 50 is a circuit that controls the light emitting device 10, and also measures the distance to a target object on the basis of a signal from the light receiving device 20. The distance measurement circuit 50 controls the driving circuit 120 of the light emitting device 10 by outputting a control signal for controlling the driving circuit 120.

In the light emitting device 10, the driving circuit 120 supplies a drive signal to the light source 113, the light source 113 emits light, and laser light 301 is generated. The laser light 301 enters the emitting section 111 and is converted into diffused light 302. The diffused light 302 is emitted through the opening 103 of the protection cover 100 and radiated onto a target object. On the other hand, part of the laser light 301 is reflected by the emitting section 111 and becomes reflection light 303. When this reflection light 303 enters the light receiving section 114, the reflection light 303 is converted into a signal (light reception signal) by the light receiving section 114, and the converted signal is output to the driving circuit 120. The driving circuit 120 can sense normal operation of the emitting section 111 by sensing the light reception signal from the light receiving section 114.

On the other hand, when reflection light 304 of the diffused light 302 reflected by the target object is radiated onto the light receiving device 20, the reflection light 304 enters the image-capturing element 23 via the lens barrel 22. The image-capturing element 23 generates an image signal from the reflection light 304, and outputs the generated image signal to the distance measurement circuit 50.

At the time of distance measurement, the distance measurement circuit 50 outputs a control signal to the driving circuit 120, causes the driving circuit 120 to drive the light source 113, and causes the diffused light 302 to be emitted. At that time, the driving circuit 120 outputs a response signal to the distance measurement circuit 50. Thereafter, the distance measurement circuit 50 measures a period of time that elapses until an image signal from the image-capturing element 23 is input. This measurement can be performed by a timer, for example. On the basis of this measured time, the distance measurement circuit 50 can measure the distance to the target object. The measured distance is output to external equipment.

The laser light 301 generated by the light source 113 is almost parallel light, and there is a possibility that the laser light 301 causes a damage to a person when it is radiated onto the person. When the emitting section 111 mentioned above goes out of place from the package of the light source device 110, the laser light 301 is radiated from the light emitting device 10, and a safety-related problem arises. In the light emitting device 10 in the figure, it is possible to sense that the emitting section 111 has gone out of place by the light receiving section 114. In a case where the emitting section 111 is arranged as the package of the light source device 110 in the manner mentioned above, the laser light 301 is radiated onto the light source device 110, and accordingly, the reflection light 303 is generated inside the light source device 110. However, when the emitting section 111 goes out of place, the reflection light 303 is not generated anymore, and accordingly, a light reception signal from the light receiving section 114 is also stopped. The driving circuit 120 monitors input of a light reception signal when outputting a drive signal to the light source 113 and thereby can sense an abnormality in a case where the emitting section 111 has gone out of place or in other cases.

When the driving circuit 120 has sensed an abnormality of the emitting section 111, the driving circuit 120 stops driving of the light source 113. Thereby, it is possible to prevent the laser light 301 from being directly emitted, and to thereby enhance safety. Note that the driving circuit 120 also can output, as a response signal to the distance measurement circuit 50, an abnormality sensing signal when the driving circuit 120 has sensed an abnormality of the emitting section 111.

Note that the configuration of the distance measuring device 1 is not limited to this example. For example, it can also be configured such that the image-capturing element 23 controls the driving circuit 120. Specifically, it can also be configured such that the image-capturing element 23 outputs a control signal to the driving circuit 120, and a response signal from the driving circuit 120 is input to the image-capturing element 23. In this case, the distance measurement circuit 50 outputs a control signal to the image-capturing element 23 to control the image-capturing element 23.

By arranging the protection cover 100, it is possible to further enhance safety of the light emitting device 10. This is because, by arranging the protection cover 100, it is possible to prevent a user or the like from contacting the emitting section 111, and it is possible to prevent the emitting section 111 from going out of place.

However, arranging the protection cover 100 gives rise to the possibility that an operation error of the light receiving section 114 occurs. Specifically, when the protection cover 100 reflects the laser light 301 to generate reflection light and the reflection light is sensed by the light receiving section 114, a light reception signal is output even in a case where the emitting section 111 has gone out of place. For example, in a case where the protection cover 100 having a relatively highly transparent window section arranged near the emitting section 111 is used for dustproofness of the light source device 110, the window section generates the reflection light 303. In such a case, it does not become possible for the driving circuit 120 to sense that the emitting section 111 has gone out of place, and the dangerous laser light 301 is emitted from the light emitting device 10. In view of this, the opening 103 is formed, and reflection light is reduced while allowing the diffused light 302 to pass therethrough. By arranging the opening 103 directly above the emitting section 111 and giving the opening 103 a tapered shape corresponding to the angle of emission of the diffused light 302 as mentioned before, reflection by the protection cover 100 can be reduced further.

At this time, it is necessary to prevent a user or the like from contacting the emitting section 111 through the opening 103. This is for preventing the advantages of the protection cover 100 from being harmed. Typically, a person such as a user makes contact with her/his finger. By preventing contact with the emitting section 111 in a case where a finger is inserted into the opening 103, damages of the emitting section 111 can be prevented.

By arranging the protection cover 100 and arranging the light receiving section 114 for sensing a damage of the emitting section 111 in this manner, safety can be secured doubly.

Here, equipment that radiates laser light falls under radiation energy sources, and a safety standard (IEC62368-1) is specified therefor. The light emitting device 10 needs to comply with IEC62368-1. Under IEC62368-1, radiation energy sources are classified into Classes 1 to 3, depending on an influence on person bodies or the like. The light emitting device 10 that outputs diffused light falls under Class 1. Safeguards for protecting person bodies from the danger of injuries or the like can be omitted in Class-1 energy sources. By making the light emitting device 10 conform to Class-1 energy sources, the convenience can be enhanced.

However, in order for the light emitting device 10 to conform to Class-1 energy sources, it needs to have a structure whose energy does not exceed an energy limit value of Class 1 in a normal operating condition and an abnormal operating condition and whose energy does not exceed an energy limit value of Class 2 in a single malfunction condition. Here, the single malfunction condition is a condition in which equipment is having a single malfunction. A condition of the light emitting device 10 in which, for example, the emitting section 111 has gone out of place corresponds to the single malfunction condition. In the single malfunction condition in which the emitting section 111 has gone out of place, the laser light 301 of the light source 113 is directly radiated from the light emitting device 10. In a case where the light source 113 falls under energy sources whose energy exceeds the energy limit value of Class 2, a protection device needs to be added. As mentioned before, by arranging the protection cover 100 including the opening 103, it is possible to sense the single malfunction condition and stop radiation of the laser light 301 from the light source 113.

In addition, accessibility to energy sources is also prescribed in IEC62368-1. It is defined in IEC62368-1 that there is accessibility when access by a person body is possible. In addition, it is prescribed that such a person body is represented by contact of a prescribed probe. Regarding the light emitting device 10, the opening 103 of the protection cover 100 can be a problem. Even in a case where there is the opening 103, the configuration needs to be one in which the emitting section 111 is not accessible. Here, the prescribed probe is a probe made to imitate a finger of a person body, and the shape is prescribed in IEC62368-1. By shaping the opening 103 such that the prescribed probe cannot contact the emitting section 111, it is possible to make the light emitting device 10 conform to IEC62368-1.

[Accessibility Test]

Figure 4:
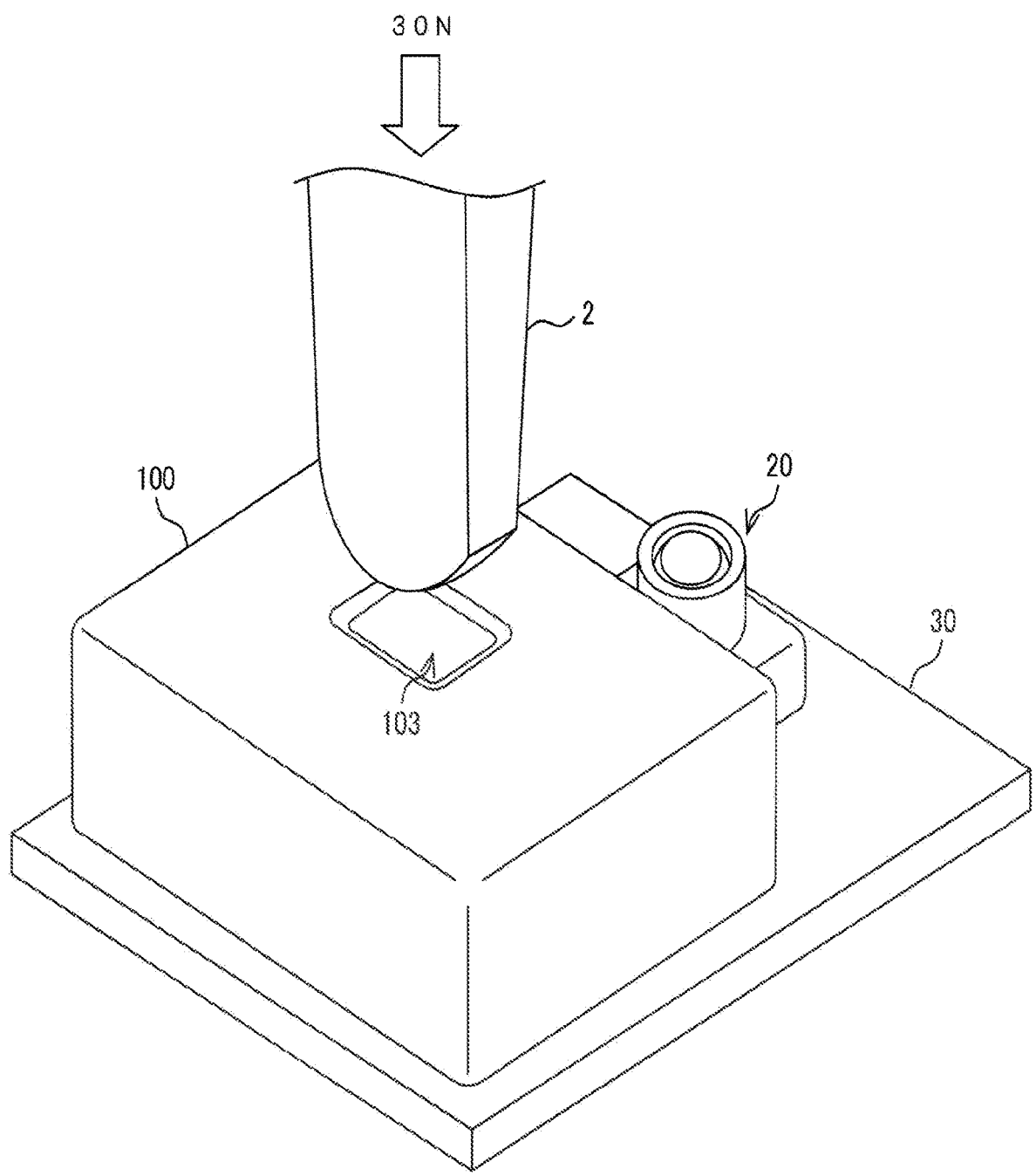
FIG. 4 is a figure depicting an example of an accessibility test according to the embodiment of the present disclosure.

FIG. 4 is a figure depicting an example of an accessibility test according to the embodiment of the present disclosure. The figure is a figure depicting the state of the accessibility test using a probe 2 which is a probe prescribed in IEC62368-1. In the figure, the probe 2 has a tapered tabular shape, and its tip has a semi-circular shape. The opening 103 of the protection cover 100 needs to be configured such that the probe 2 does not physically interfere with the emitting section 111 through the opening 103. In addition, it can be determined that the emitting section 111 is not accessible in a case where the emitting section 111 is not damaged when a load of 30 N is applied to the probe 2.

[Shape of Opening]

Figure 5:
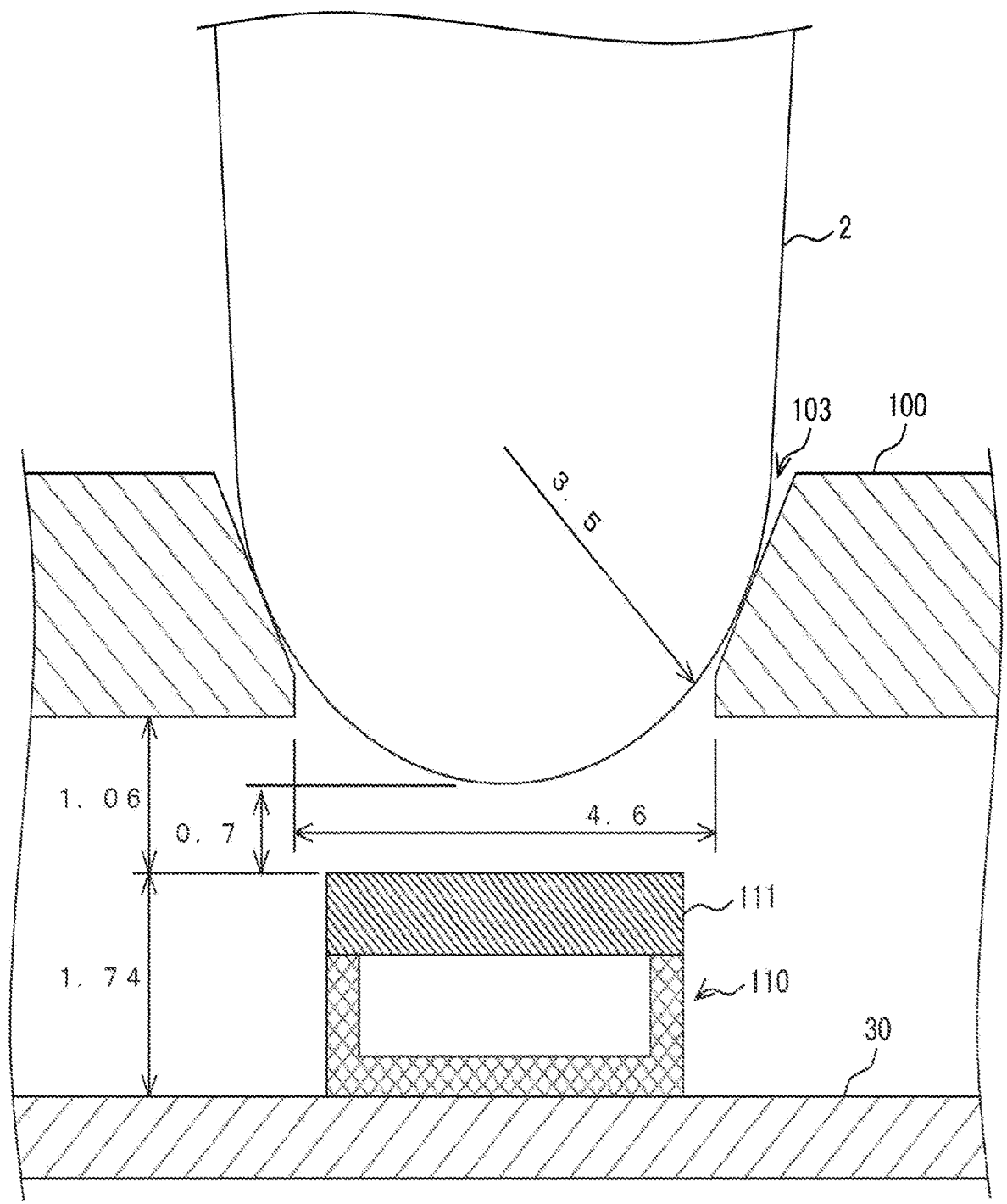
FIG. 5 is a figure depicting a configuration example of an opening of a protection cover according to the embodiment of the present disclosure.

FIG. 5 is a figure depicting a configuration example of the opening of the protection cover according to the embodiment of the present disclosure. The figure is a cross-sectional view depicting a condition where the probe 2 is pressed against the opening 103. As depicted in the figure, the tip of the probe 2 has a circular shape having a radius of 3.5 mm. In addition, it is supposed that the height of the light source device 110 from the substrate 30 is 1.74 mm. By setting the width of the opening 103 to 4.6 mm, the distance between the tip of the probe 2 and the emitting section 111 can be made approximately 0.7 mm in a case where the vertical distance between the top surface of the emitting section 111 and the top plate of the protection cover 100 is equal to or larger than 1.0 mm. In the figure, the vertical distance is set to 1.06 mm. Thereby, the configuration in which the probe 2 does not physically interfere with the emitting section 111 can be realized.

Note that the figure depicts an example of a case where the tip of the probe 2 is pressed against the rectangular opening 103 such that the tip of the probe 2 becomes parallel to sides of the opening 103. In a case where the thickness of the tip of the probe 2 is thin, the distance between the tip of the probe 2 and the emitting section 111 becomes the shortest in a case where the tip of the probe 2 is pressed against the opening 103 such that the tip of the probe 2 becomes parallel to a diagonal of the opening 103. In this case, the width of the diagonal of the opening 103 is approximately 6.5 mm, and the distance between the tip of the probe 2 and the emitting section 111 is approximately 0.55 mm. Even in this case, the configuration in which the probe 2 does not physically interfere with the emitting section 111 can be realized.

That is, by arranging the rectangular opening 103 with the lengths of sides which are equal to or shorter than 4.6 mm, the configuration without accessibility can be realized. Note that, even in a case where a load of 30 N is applied, damages to the emitting section 111 can be prevented by making the deflection of the opening 103 of the protection cover 100 smaller than 0.55 mm. Thereby, it is possible to make the light emitting device 10 conform to the requirements related to accessibility in IEC62368-1.

As explained above, the light emitting device 10 according to the embodiment of the present disclosure can prevent operation errors at the time when it has been sensed that the emitting section 111 has gone out of place, by arranging the opening 103 in the protection cover 100. It is possible to make the light emitting device 10 conform to Class-1 equipment in IEC62368-1. In addition, by arranging the opening 103 adjacent to the emitting section 111 and also shaping the opening 103 such that a probe made to imitate a finger of a person is prevented from contacting the emitting section 111, it is possible to make the light emitting device 10 conform to what is prescribed about accessibility in IEC62368-1.

2. Modification Example

Whereas the protection cover 100 of the embodiment mentioned above has the rectangular tapered opening 103 arranged therein, an opening 103 having another shape can also be arranged therein.

[Shape of Opening]

Figure 6A:
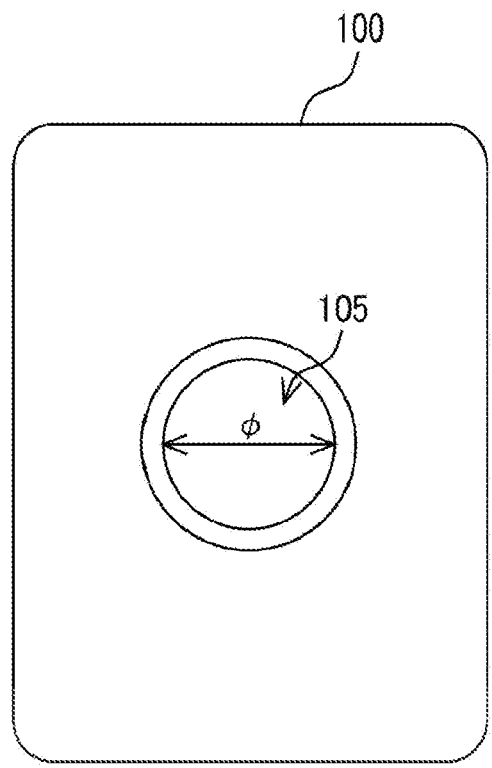
FIGS. 6A and 6B depicts figures illustrating a configuration example of an opening of the protection cover according to a modification example of the embodiment of the present disclosure.
Figure 6B:
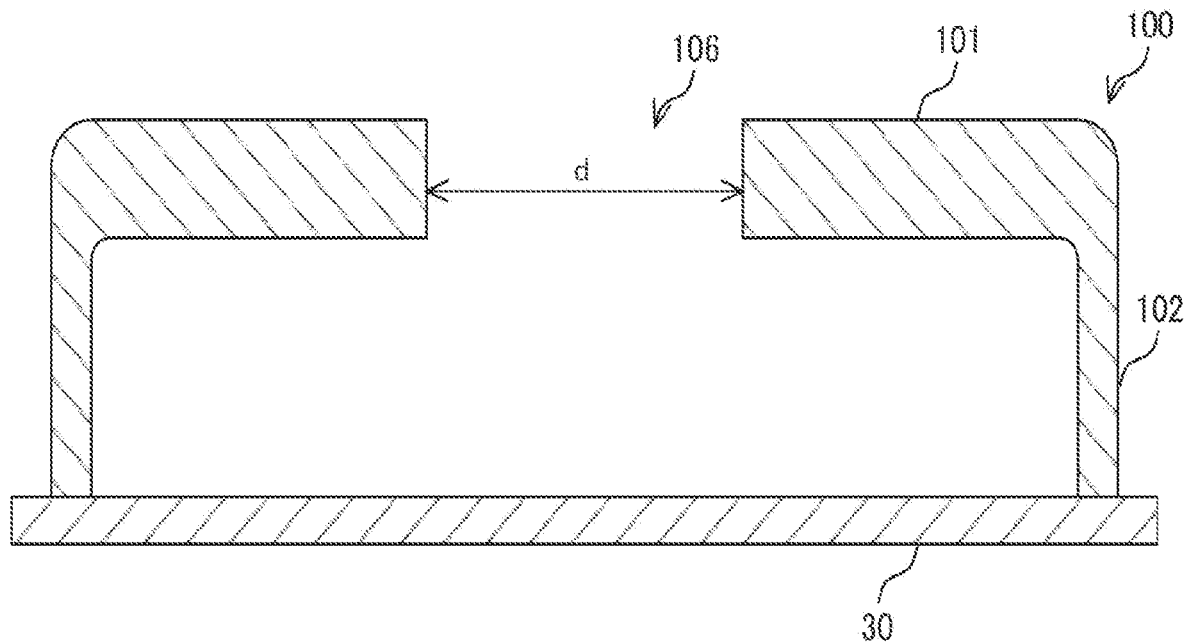

FIGS. 6A and 6B are figures depicting a configuration example of an opening of the protection cover according to a modification example of the embodiment of the present disclosure. FIG. 6A is a figure depicting an example of an opening 105 having a circular shape and having a tapered shape. By making the diameter ϕ smaller than 5.1 mm, the opening 105 can be configured such that the probe 2 used in an accessibility test does not physically interfere with the emitting section 111. In addition, FIG. 6B is a figure depicting an example of an opening 106 having a cylindrical cross-sectional shape. Similarly to the protection cover 100 explained with reference to FIG. 2, the opening width d of the opening 106 can be made equal to or smaller than 4.6 mm.

In other respects, the configuration of the distance measuring device 1 is similar to the configuration of the distance measuring device 1 explained in the first embodiment of the present disclosure, and accordingly, explanations are omitted.

Lastly, the explanation of each embodiment mentioned above is an example of the present disclosure, and the present disclosure is in no way limited to the embodiment mentioned above. Because of this, certainly, various modifications are possible in accordance with designs or the like as long as such modifications are within the scope not deviating from the technical idea according to the present disclosure, even if the modifications are other than each embodiment mentioned above.

In addition, advantages described in the present specification are presented merely for illustrative purposes, and advantages of the present disclosure are not limited to them. In addition, there may be other advantages.

In addition, the figures in the embodiment mentioned above are schematic figures, and the dimensional ratios of sections or the like do not necessarily match actual ratios or the like. In addition, certainly, dimensional relations or ratios may include differences between the figures also.

Note that the present technology can also have configurations like the ones mentioned below.

(1) A protection cover which covers a light source device including a light source, an emitting section that converts light of the light source into diffused light to emit the light, and a light receiving section that senses the light of the light source reflected by the emitting section, in which
  the protection cover includes an opening arranged adjacent to the emitting section and having a shape that allows transmission of the emitted light and also that prevents a finger of a person from contacting the emitting section.

(2) The protection cover according to (1), in which
  the opening has a shape that prevents a probe made to imitate a finger of a person prescribed in IEC62368-1 from contacting the emitting section.

(3) The protection cover according to (1) or (2), in which
  the opening has a rectangular shape.

(4) The protection cover according to (3), in which
  the opening has a rectangular shape having lengths of sides which are shorter than 4.6 mm.

(5) The protection cover according to (1) or (2), in which
  the opening has a circular shape.

(6) The protection cover according to (5), in which
  the opening has a circular shape having a diameter which is shorter than 5.1 mm.

(7) The protection cover according to any of (1) to (6), in which
  a vertical distance between an end section of the opening and the emitting section is longer than 1 mm.

(8) The protection cover according to any of (1) to (7), in which
  the opening has a tapered shape.

(9) The protection cover according to any of (1) to (8), in which
  the protection cover includes a member that blocks the emitted light.

(10) A light emitting device including:
  a light source device including a light source, an emitting section that converts light of the light source into diffused light to emit the light, and a light receiving section that senses the light of the light source reflected by the emitting section; and
  a protection cover which covers the light source device and includes an opening arranged adjacent to the emitting section and having a shape that allows transmission of the emitted light and also that prevents a finger of a person from contacting the emitting section.

(11) The light emitting device according to (10), further including:

a driving circuit that drives the light source device.

REFERENCE SIGNS LIST

1: Distance measuring device
2: Probe
10: Light emitting device
20: Light receiving device
23: Image-capturing element
30: Substrate
50: Distance measurement circuit
100: Protection cover
103, 105, 106: Opening
110: Light source device
111: Emitting section
112: Housing
113: Light source
114: Light receiving section
120: Driving circuit

The invention claimed is:

1. A distance measuring device, comprising:
a light emitting device that includes:
  a light source device including:
    a light source configured to generate light;
    an emitting section configured to:
      convert the generated light into diffused light;
      emit the diffused light; and
    a light receiving section configured to detect reflected light in the light source device, wherein the reflected light is associated with the generated light; and
  a driving section configured to stop driving of the light source based on absence of the reflected light in the light source device; and
  a protection cover configured to cover the light source device, wherein
    the protection cover includes an opening adjacent to the emitting section, and
    the opening has a shape that:
      allows transmission of the emitted diffused light, and
      prevents a finger of a person to be in contact with the emitting section.

2. The distance measuring device according to claim 1, wherein
the shape of the opening further prevents a probe to be in contact with the emitting section, and
the probe imitates the finger of the person.

3. The distance measuring device according to claim 1, wherein the opening has a rectangular shape.

4. The distance measuring device according to claim 3, wherein the opening, having the rectangular shape, has lengths of sides which are one of equal to or shorter than 4.6 mm.

5. The distance measuring device according to claim 1, wherein the opening has a circular shape.

6. The distance measuring device according to claim 5, wherein the opening, having the circular shape, has a diameter which is one of equal to or shorter than 5.1 mm.

7. The distance measuring device according to claim 1, wherein a vertical distance between an end section of the opening and the emitting section is longer than 1 mm.

8. The distance measuring device according to claim 1, wherein the opening has a tapered shape.

9. The distance measuring device according to claim 1, wherein
the protection cover includes a member, and
the member is configured to block the diffused emitted light.

10. A light emitting device, comprising:
a light source device including:
  a light source configured to generate light;
  an emitting section configured to:
    convert the generated light into diffused light;
    emit the diffused light; and
  a light receiving section configured to detect reflected light in the light source device, wherein the reflected light is associated with the generated light;
a driving section configured to:
  detect an abnormality of the emitting section based on absence of the reflected light in the light source device; and
  stop driving of the light source based on the detected abnormality; and
a protection cover configured to cover the light source device, wherein
  the protection cover includes an opening adjacent to the emitting section,
  the opening has a shape that:
    allows transmission of the emitted diffused light, and
    prevents a finger of a person to be in contact with the emitting section.

* * * * *